United States Patent
Kitano et al.

(10) Patent No.: US 8,865,841 B2
(45) Date of Patent: Oct. 21, 2014

(54) THIOL-CONTAINING LIQUID RUBBER COMPOSITION

(75) Inventors: Hajime Kitano, Kunitachi (JP); Shuyou Akama, Saitama (JP)

(73) Assignee: Bridgestone Corporation, Tokyo (JP)

( * ) Notice: Subject to any disclaimer, the term of this patent is extended or adjusted under 35 U.S.C. 154(b) by 24 days.

(21) Appl. No.: 13/264,666

(22) PCT Filed: Apr. 16, 2010

(86) PCT No.: PCT/JP2010/002794
§ 371 (c)(1),
(2), (4) Date: Oct. 31, 2011

(87) PCT Pub. No.: WO2010/119708
PCT Pub. Date: Oct. 21, 2010

(65) Prior Publication Data
US 2012/0041154 A1     Feb. 16, 2012

(30) Foreign Application Priority Data
Apr. 16, 2009   (JP) ................................. 2009-100152

(51) Int. Cl.
*C08K 5/37*   (2006.01)
*C08L 9/06*   (2006.01)
*C08L 21/00*  (2006.01)
*G03C 1/73*   (2006.01)

(52) U.S. Cl.
CPC ....................................... *C08K 5/37* (2013.01)
USPC ...... 525/350; 525/332.9; 525/348; 430/286.1

(58) Field of Classification Search
CPC .................................. C08K 5/37; C08L 9/06
USPC ..................... 525/332.9, 348, 350; 430/286.1
See application file for complete search history.

(56) References Cited

U.S. PATENT DOCUMENTS

| 4,083,834 A | * | 4/1978 | Komatsu et al. .............. 525/346 |
| 4,179,531 A | | 12/1979 | Hein et al. |
| 4,286,019 A | | 8/1981 | Fahey |

FOREIGN PATENT DOCUMENTS

| JP | 60-006941 A | | 1/1985 |
| JP | 2000-177234 A | | 6/2000 |
| JP | 2005-248107 A | | 9/2005 |
| JP | 2008-081713 | * | 4/2008 |

OTHER PUBLICATIONS

Machine translation of JP 2008-081713; pub. date: Apr. 2008.*
International Search Report of PCT/JP2010/002794, dated May 18, 2010.
Chinese Office Action dated Nov. 23, 2012 issued in Chinese Patent Application No. 201080027163.9.
Chinese Office Action for corresponding Application No. 201080027163.9 dated Aug. 28, 2013.
Chinese Office Action for Application No. 201080027163.9 dated Dec. 26, 2013.
Communication dated May 27, 2014 from the Japanese Patent Office in counterpart Japanese application No. 2011-509228.

* cited by examiner

*Primary Examiner* — Fred M Teskin
(74) *Attorney, Agent, or Firm* — Sughrue Mion, PLLC

(57) ABSTRACT

The invention provides a rubber composition comprising a styrene-butadiene copolymer and having improved compatibility with a thiol-based crosslinking agent and also having increased curability.

As means for solving the problems, the inventive thiol-containing liquid rubber composition comprises (A) a styrene-butadiene copolymer which is liquid at 25° C. and (B) a polythiol derived from mercaptocarboxylic acid, wherein the styrene-butadiene copolymer (A) desirably has a bound styrene content of 20 to 90% by mass.

5 Claims, No Drawings

THIOL-CONTAINING LIQUID RUBBER COMPOSITION

CROSS REFERENCE TO RELATED APPLICATION

This application is a National Stage of International Application No. PCT/JP2010/002794 filed Apr. 16, 2010, claiming priority based on Japanese Patent Application No. 2009-100152, filed Apr. 16, 2009, the contents of all of which are incorporated herein by reference in their entirety.

TECHNICAL FIELD

The present invention generally relates to a thiol-containing liquid rubber composition comprising a liquid styrene-butadiene copolymer and a particular polythiol, and having increased curability.

RELATED ART

Recently, rubber compositions with rubber-based resin such as styrene-butadiene copolymer have been used in various applications, such as rollers including developing, charging or transfer rollers, blades including developing or cleaning blades for use in printers or copiers, gasket members, sealing materials for displays, sealing materials for construction, or the like. To cure such rubber-based resin, curing process is performed by adding, e.g., thiol-based crosslinking agents, such as triazine thiol compounds (see Patent Document 1 below).

RELATED ART DOCUMENT

Patent Document

Patent Document 1: JP-A-2000-177234

DISCLOSURE OF THE INVENTION

Problems to be Solved by the Invention

However, such thiol-based crosslinking agents have polarity, which leads to poor compatibility with rubber-based resin such as styrene-butadiene copolymer. This may leave some parts uncured at the time of light or thermal curing due to poor homogeneity of the solution, or cause phase separation, which leads to reduced storage stability. These phenomena could increase the opacity of the composition and thus degrade its light transmission property, which results in insufficient internal cure, particularly in the event of light curing.

Therefore, an object of the present invention is to provide a rubber composition comprising such a styrene-butadiene copolymer and having improved compatibility with a thiol-based crosslinking agent and also having increased curability.

Means for Solving the Problem

To solve the above-described problems, the inventor has found a thiol-containing liquid rubber composition comprising a particular styrene-butadiene copolymer and a polythiol. Based on this, the present invention is completed.

That is, a thiol-containing liquid rubber composition of the present invention comprises:

(A) a styrene-butadiene copolymer which is liquid at 25° C.; and (B) a polythiol derived from mercaptocarboxylic acid.

In addition, the styrene-butadiene copolymer (A) preferably has a bound styrene content of 20 to 90% by mass and is desirably a random copolymer.

Preferably, the polythiol (B) is at least one selected from the group consisting of tetraethylene glycol bis(3-mercaptopropionate), trimethylol propane tris(3-mercaptopropionate), tris[(3-mercaptopropionyloxy)-ethyl]isocyanurate, pentaerythritol tetrakis(3-mercaptopropionate), dipentaerythritol hexakis(3-mercaptopropionate), 1,4-bis(3-mercaptobutyryloxy)butane, pentaerythritol tetrakis(3-mercaptobutylate) and 1,3,5-tris(3-mercaptobutyloxyethyl)-1,3,5-triazine-2,4,6(1H,3H,5H)-trione.

The polythiol (B) may be contained in an amount of 40 parts by mass or less per 100 parts by mass of the styrene-butadiene copolymer (A).

Desirably, the styrene-butadiene copolymer (A) has a number average molecular weight (Mn) of 1200-40000.

Effect of the Invention

The thiol-containing liquid rubber composition of the present invention is excellent in compatibility with both a styrene-butadiene copolymer which is a rubber-based resin and a polythiol (B) as a crosslinking agent. This may avoid the generation of uncured parts due to poor homogeneity of the solution. In addition, the ability to effectively reduce generation of uncured parts may provide good curability, whether in light curing or thermal curing.

Thus, it is possible to obtain a homogeneous composition with stable performance, which is useful in a wide variety of applications, such as rollers including developing, charging or transfer rollers, blades including developing or cleaning blades for use in printers or copiers, gasket members, sealing materials for displays, sealing materials for construction, or the like.

BEST MODE FOR CARRYING OUT THE INVENTION

The present invention will now be described in detail below.

A thiol-containing liquid rubber composition of the present invention comprises:

(A) a styrene-butadiene copolymer which is liquid at 25° C.; and (B) a polythiol derived from mercaptocarboxylic acid, wherein an initiator for use in applying light or thermal curing can be added to the thiol-containing liquid rubber composition as needed.

[Styrene-Butadiene Copolymer (A)]

The styrene-butadiene copolymer (A) used in the thiol-containing liquid rubber composition of the present invention is liquid at 25° C. (room temperature). Generally, diene-based rubber such as butadiene rubber or isoprene rubber is nonpolar and thus shows unfavorable compatibility with polar compounds, such as thiol-based crosslinking agents. However, as is the case with the present invention, if such a liquid styrene-butadiene copolymer (A) is used with a particular thiol-based crosslinking agent as described below, then compatibility is improved even though the styrene-butadiene copolymer is also nonpolar. Therefore, each components can be mixed more easily According to the inventive method, the above-described styrene-butadiene copolymer (A) may be obtained by copolymerizing, without limitation, 1,3-butadiene monomer and styrene monomer. As used herein, a lithium-based polymerization initiator may be used for copolymerization, and more particularly, a randomizer may be used if necessary. In addition, in the event of anionic polymerization using a lithium-based polymerization initiator for production, different modifiers may optionally be used to modify a living end of a polymer chain. For example, an alkylene oxide, such as ethylene oxide or propylene oxide, can be used as a modifier to obtain a diene-based polymer having a hydroxyl group on each or one end thereof.

Besides, monomer units may be arranged in the styrene-butadiene copolymer (A) in the form of, without limitation, either random copolymer, alternating copolymer, block copolymer or graft copolymer; preferably in the form of random copolymer. In random copolymer, an unsaturated group should be arranged in the copolymer in a more random manner, which may contribute to improvements in compatibility with the polythiol (B), heat resistance of the cured objects, and so on. To obtain a random copolymer, for example, polymerization may be carried out with the addition of ether such as tetrahydrofuran or randomizer such as 2,2-bis(tetrahydrofuryl)propane.

It is desirable that the above-described styrene-butadiene copolymer (A) has a number average molecular weight (Mn) of 1200-40000, preferably 3000-30000. If the number average molecular weight (Mn) is 1200 or more, there is no problem in the amount of unsaturated groups contained and good physical properties such as tenacity and elongation can be achieved; and if 40000 or less, good workability can be obtained at the time of molding in terms of compatibility with polythiol or viscosity.

It is desirable that the above-described styrene-butadiene copolymer (A) has a bound styrene content of 90% by mass or less, preferably 25-65% by mass. It is also desirable that the butadiene part has a vinyl bond content of 20-85%, preferably 25-80%. The liquid styrene-butadiene copolymer, which has a bound styrene content or a vinyl bond content in the butadiene part falling within the aforementioned range, may improve curability as well as compatibility with polythiol. It is believed that this is because the styrene part contributes to compatibility and the vinyl bond part particularly contributes to curability.

It is also desirable that the styrene-butadiene copolymer (A) has a hydroxyl group on each or one end thereof. The resultant styrene-butadiene copolymer (A) further improves compatibility with polythiol.

[Mercaptocarboxylic Acid-Derived Polythiol (B)]

The polythiol (B), which is used in the thiol-containing liquid rubber composition of the present invention, is a polythiol derived from mercaptocarboxylic acid (B), preferably a polythiol derived from 3-mercaptopropionic acid. This polythiol (B) preferably has a plurality of mercaptoacyloxy groups, more preferably 2-6 mercaptoacyloxy groups in the molecule. Specifically, the mercaptoacyloxy groups include 3-mercaptopropionyloxy group [HS—(CH$_2$)$_2$—COO—], 3-mercaptobutyryloxy group [HS—CH(CH$_3$)—CH$_2$—COO—] and so on; among these, preferred is 3-mercaptopropionyloxy group. If this polythiol derived from mercaptocarboxylic acid (B) contains, for example, a thermal radical generator, it utilizes a radical derived from that thermal radical generator to generate a thiyl radical, which in turn is added to an unsaturated bond of the styrene-butadiene copolymer (A). This promotes curing (crosslinking) reaction.

As specific examples of the above-described polythiol (B), the following are preferred: tetraethylene glycol bis(3-mercaptopropionate) represented by the following chemical formula (I); trimethylol propane tris(3-mercaptopropionate) represented by (II); tris[(3-mercaptopropionyloxy)-ethyl] isocyanurate represented by (III); pentaerythritol tetrakis(3-mercaptopropionate) represented by (IV); dipentaerythritol hexakis(3-mercaptopropionate) represented by (V); 1,4-bis (3-mercaptobutyryloxy)butane represented by (VI); pentaerythritol tetrakis(3-mercaptobutylate) represented by (VII); and 1,3,5-tris(3-mercaptobutyloxyethyl)-1,3,5-triazine-2,4,6(1H,3H,5H)-trione represented by (VIII).

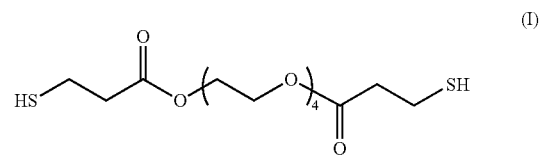

(I)

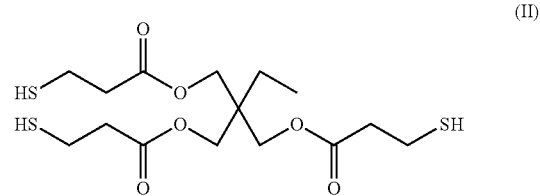

(II)

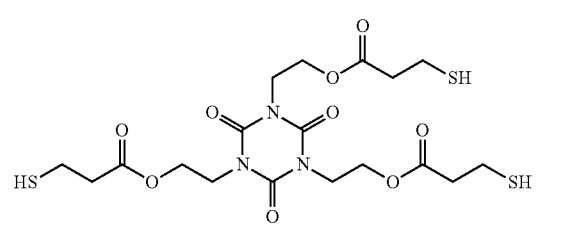

(III)

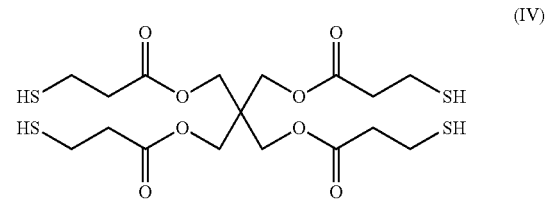

(IV)

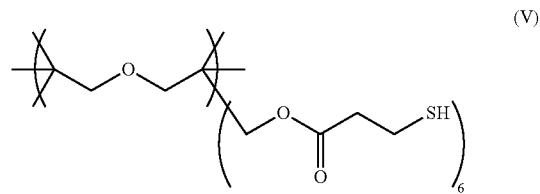

(V)

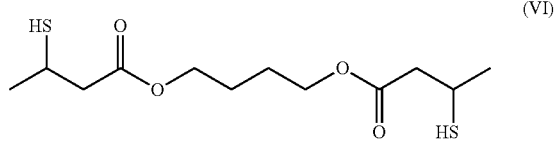

(VI)

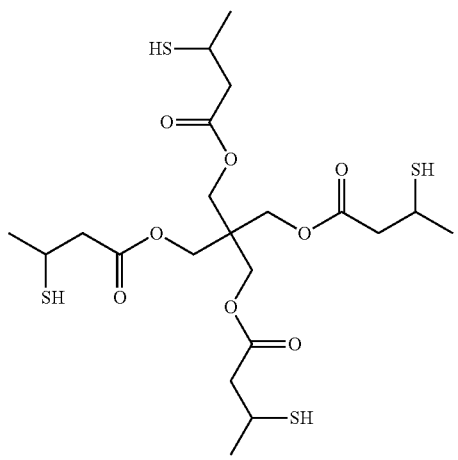

(VII)

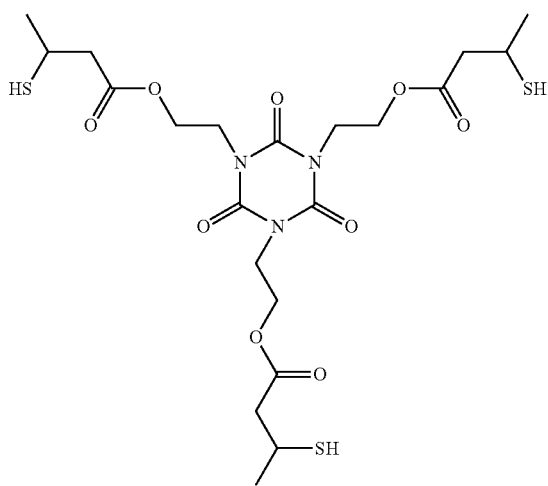

(VIII)

These examples of the polythiol (B) are highly compatible with the styrene-butadiene copolymer (A) and can thus provide a homogeneous composition with stable performance. Besides, each example of the polythiol (B) may be used alone or in combination with one or more other examples.

Each example of the polythiol (B) is contained in an amount within a range of, without limitation, preferably 40 parts by mass or less, more preferably 3-35 parts by mass, even more preferably 5-30 parts by mass, per 100 parts by mass of the styrene-butadiene copolymer (A). If the polythiol (B) is contained in an amount of 40 parts by mass or less, then it is possible to maintain good compatibility with liquid rubber. Further, it is desirable that the polythiol (B) is contained in an amount of 3 parts by mass or more since light or thermal curability of the composition can be improved sufficiently.

[Thiol-Containing Liquid Rubber Composition]

In addition to the components mentioned above, the thiol-containing liquid rubber composition of the present invention may also contain so-called diene-based polymers other than the styrene-butadiene copolymer (A), without departing from the object of the invention.

Examples of the diene-based polymers include natural rubber, polyisoprene, polybutadiene, butadiene-isoprene copolymer, isobutylene-isoprene copolymer, butadiene-acrylonitrile copolymer, styrene-isoprene copolymer, polychloroprene, and so on. The ends of these diene-based polymers may or may not be modified.

In addition, when the thiol-containing liquid rubber composition of the present invention is to be light-cured, it may contain a photopolymerization initiator. Specific examples of the photopolymerization initiator include: as intramolecular cleavage type, benzoin derivatives, benzyl ketals [e.g., IRGACURE 651 (trade name) manufactured by Ciba Specialty Chemicals Inc.], α-hydroxy acetophenones [e.g., DAROCUR 1173, IRGACURE 184, IRGACURE 127 (trade name) manufactured by Ciba Specialty Chemicals Inc.], α-amino acetophenones [e.g., IRGACURE 907, IRGACURE 369 (trade name) manufactured by Ciba Specialty Chemicals Inc.], a combination of α-amino acetophenones and thioxanthones (e.g., isopropylthioxanthone, diethylthioxanthone), acyl phosphine oxides [e.g., IRGACURE 819 (trade name) manufactured by Ciba Specialty Chemicals Inc.], and so on; and as hydrogen abstraction type, a combination of benzophenones and amine, a combination of thioxanthone and amine, and so on. A combination of intramolecular cleavage type and hydrogen abstraction type is also possible. Among others, oligomerized a-hydroxy acetophenones and acrylated benzophenones are preferred. More specific examples include oligo[2-hydroxy-2-methyl-1-[4-(1-methylvinyl)phenyl]propanone] [e.g., ESACURE KIP150 (trade name) manufactured by Lamberti S.p.A], acrylated benzophenone [e.g., Ebecryl P136 (trade name) manufactured by Daicel-UCB Company, Ltd.], imide acrylate, and so on.

In addition to the above, the following may also be used as the photopolymerization initiator: 1-[4-(2-hydroxyethoxy) phenyl]-2-methyl-1-propane-1-one, 1-hydroxy-cyclohexyl-phenylketone [e.g., IRAGACURE184 (trade name) manufactured by Ciba Specialty Chemicals Inc.], a mixture of 1-hydroxy -cyclohexyl-phenyl-ketone and benzophenone, 2,2-dimethoxy-1,2-diphenylethane-1-one, 2,4,6-trimethyl-benzoyl-phenylphosphine oxide, 2,4,6-trimethylbenzoyl-phenyl-phenyl-ethoxy -phosphine oxide, 2-benzyl-2-dimethylamino-1-(4-morpholinophenyl)butanone-1, 2-hydroxy-2-methyl-1-phenyl-propane-1-one, 2-methyl-1-[(4-methylthio)phenyl]-2-morpholinopropane-1-one, benzoyl methyl ether, benzoyl ethyl ether, benzoyl butyl ether, benzoyl isopropyl ether, bis(2,4,6-trimethylbenzoyl)phenylphosphine oxide, 2-hydroxy-2-methyl-[4-(1-methylvinyl)phenyl]propanol oligomer, a mixture of 2-hydroxy-2-methyl-[4-(1-methylvinyl)phenyl]propanol oligomer and 2-hydroxy-2-methyl-1-phenyl-1-propanone, isopropylthioxanthone, methyl o-benzoylbenzoate, [4-(methylphenylthio) phenyl]phenylmethane, and so on.

The photopolymerization initiator is contained in an amount within a range of preferably 0.01-20 parts by mass, more preferably 0.05-15 parts by mass, even more preferably 0.1-10 parts by mass, per 100 parts by mass of the total of the styrene-butadiene copolymer (A) and the polythiol (B).

Further, when the thiol-containing liquid rubber composition of the present invention is thermally cured, such a radical generator may also be combined therewith that is responsible for acting to initiate (promote) thermal curing of the composition. Preferably, examples of the thermal radial generator are organic peroxides and azobis-based compounds. Each of the thermal radical generators may be used alone or in combination with one or more other thermal radical generators.

The above-described organic peroxides include, for example, 1,1-di(t-hexylperoxy)-3,3,5-trimethylcyclohexane, t-amylperoxy-2-ethylhexanoate, di(2-t -butylperoxyisopropyl)benzene, benzoyl peroxide, 1,1'-di(t-butylperoxy)cyclohexane, di(3,5,5-trimethylhexanoyl)peroxide, t-butylperoxyneodecanoate, t-hexylperoxyneodecanoate, dicumylperoxide, and so on.

The above-described azobis-based compounds include, for example, 2,2'-azobis(2-methylpropionitrile), 2,2'-azobis(2-methylbutyronitrile), 2,2'-azobis(2,4-dimethylvaleronitrile), 2,2'-azobis(4-methoxy-2,4-dimethylvaleronitrile), 2-phenylazo-4-methoxy-2,4-dimethylvaleronitrile, dimethyl2,2'-azobis(2-methylpropionate), and so on.

The radical generator is contained in an amount within a range of, without limitation, preferably 0.05-30 parts by mass, more preferably 0.2-20 parts by mass, even more preferably 0.5-15 parts by mass, per 100 parts by mass of the styrene-butadiene copolymer (A). If the radical generator is contained in an amount of 0.05 parts by mass or more, it is possible to initiate thermal curing reaction of the composition; or if 30 parts by mass or less, it is possible to prevent gas generation caused by the radical generator, bleed out of the radical generator residues, outgas generation, and so on.

Since the above-mentioned thiol-containing liquid rubber composition of the present invention is excellent in both light curability and thermal curability, it is useful in various applications in particular, such as rollers including developing, charging or transfer rollers, blades including developing or cleaning blades for use in printers or copiers, gasket members, sealing materials for displays, sealing materials for construction, or the like.

EXAMPLE

While the present invention is described based on specific examples, the present invention is not limited to these examples. Hereinafter, "styrene-butadiene copolymer" is also referred to as "SB copolymer".

Production Example 1

Synthesis of SB Copolymer A

To a sufficiently dehydrated and purified cyclohexane solvent are added 1 mol of 1,3-(diisopropenyl)benzene, then 2 mol of triethylamine and 2 mol of sec-butyllithium sequentially, followed by stirring at 50° C. for two hours to prepare a dilithium-based polymerization initiator.

To a 7-liter polymerization reactor after argon substitution are added 1.5 kg of dehydrated and purified cyclohexane, 1.65 kg of a solution of 22.9% by mass of 1,3-butadiene monomer in hexane, 1.00 kg of a solution of 20.0% by mass of styrene monomer in cyclohexane and 200 ml of a solution of 1.15 mol/liter of 2,2-bis(tetrahydrofuryl)propane in hexane, and then 230 ml of 0.5 mol/liter of the above-described dilithium-based polymerization initiator to initiate polymerization.

After polymerization in the polymerization reactor at a raised temperature of 50° C. for 1.5 hours, 254 ml of a solution of 1 mol/liter of ethylene oxide in cyclohexane is added to the mixture, which in turn is further stirred for two hours and then added with 50 ml of isopropyl alcohol. Subsequently, the solution of the polymer in hexane is precipitated in isopropyl alcohol and dried sufficiently to obtain liquid rubber which has a hydroxyl group at each end and is liquid at 25° C.

The liquid rubber thus obtained is a styrene-butadiene copolymer (SB copolymer A) which is terminated at each end with a hydroxyl group and has a bound styrene content of 35% by mass as well as a vinyl bond content of 65% in the butadiene part. In addition, it has a number average molecular weight of 5200, a weight average molecular weight of 6700 and a molecular weight distribution of 1.28.

Production Example 2

Synthesis of SB Copolymer B

To a sufficiently dehydrated and purified cyclohexane solvent are added 1 mol of 1,3-(diisopropenyl)benzene, then 2 mol of triethylamine and 2 mol of sec-butyllithium sequentially, followed by stirring at 50° C. for two hours to prepare a dilithium-based polymerization initiator.

To a 7-liter polymerization reactor after argon substitution are added 1.45 kg of dehydrated and purified cyclohexane, 1.15 kg of a solution of 22.9% by mass of 1,3-butadiene monomer in hexane, 1.65 kg of a solution of 20.0% by mass of styrene monomer in cyclohexane and 200 ml of a solution of 1.15 mol/liter of 2,2-bis(tetrahydrofuryl)propane in hexane, and then 230 ml of 0.5 mol/liter of the above-described dilithium-based polymerization initiator to initiate polymerization.

After polymerization in the polymerization reactor at a raised temperature of 50° C. for 1.5 hours, 254 ml of a solution of 1 mol/liter of ethylene oxide in cyclohexane is added to the mixture, which in turn is further stirred for two hours and then added with 50 ml of isopropyl alcohol. Subsequently, the solution of the polymer in hexane is precipitated in isopropyl alcohol and dried sufficiently to thereby obtain liquid rubber which has a hydroxyl group at each end and is liquid at 25° C.

The liquid rubber thus obtained is a styrene-butadiene copolymer (SB copolymer B) which is terminated at each end with a hydroxyl group and has a bound styrene content of 55% by mass as well as a vinyl bond content of 65% in the butadiene part. In addition, it has a number average molecular weight of 4000, a weight average molecular weight of 4800 and a molecular weight distribution of 1.20.

Production Example 3

Synthesis of SB Copolymer C

To a sufficiently dehydrated and purified cyclohexane solvent are added 1 mol of 1,3-(diisopropenyl)benzene, then 2 mol of triethylamine and 2 mol of sec-butyllithium sequentially, followed by stirring at 50° C. for two hours to prepare a dilithium-based polymerization initiator.

To a 7-liter polymerization reactor after argon substitution are added 1.45 kg of dehydrated and purified cyclohexane, 2.00 kg of a solution of 22.9% by mass of 1,3-butadiene monomer in hexane, 0.765 kg of a solution of 20.0% by mass of styrene monomer in cyclohexane and 200 ml of a solution of 1.15 mol/liter of 2,2-bis(tetrahydrofuryl)propane in hexane, and then 224 ml of 0.5 mol/liter of the above-described dilithium-based polymerization initiator to initiate polymerization.

After polymerization in the polymerization reactor at a raised temperature of 50° C. for 1.5 hours, 254 ml of a solution of 1 mol/liter of ethylene oxide in cyclohexane is added to the mixture, which in turn is further stirred for two hours and then added with 50 ml of isopropyl alcohol. Subsequently, the solution of the polymer in hexane is precipitated in isopropyl alcohol and dried sufficiently to thereby obtain liquid rubber which has a hydroxyl group at each end and is liquid at 25° C.

The liquid rubber thus obtained is a styrene-butadiene copolymer (SB copolymer C) which is terminated at each end with a hydroxyl group and has a bound styrene content of 23% by mass as well as a vinyl bond content of 65% in the butadiene part. In addition, it has a number average molecular weight of 4900, a weight average molecular weight of 6200 and a molecular weight distribution of 1.26.

Production Example 4

Synthesis of SB Copolymer D

To a sufficiently dehydrated and purified cyclohexane solvent are added 1 mol of 1,3-(diisopropenyl)benzene, then 2 mol of triethylamine and 2 mol of sec-butyllithium sequentially, followed by stirring at 50° C. for two hours to prepare a dilithium-based polymerization initiator.

To a 7-liter polymerization reactor after argon substitution are added 1.5 kg of dehydrated and purified cyclohexane, 1.65 kg of a solution of 22.9% by mass of 1,3-butadiene monomer in hexane, 1.00 kg of a solution of 20.0% by mass of styrene monomer in cyclohexane and 300 ml of a solution of 1.15 mol/liter of 2,2-bis(tetrahydrofuryl)propane in hexane, and then 230 ml of 0.5 mol/liter of the above-described dilithium-based polymerization initiator to initiate polymerization.

After polymerization in the polymerization reactor at a raised temperature of 50° C. for 1.5 hours, 254 ml of a solution of 1 mol/liter of ethylene oxide in cyclohexane is added to the mixture, which in turn is further stirred for two hours and then added with 50 ml of isopropyl alcohol. Subsequently, the solution of the polymer in hexane is precipitated in isopropyl alcohol and dried sufficiently to thereby obtain liquid rubber which has a hydroxyl group at each end and is liquid at 25° C.

The liquid rubber thus obtained is a styrene-butadiene copolymer (SB copolymer D) which is terminated at each end with a hydroxyl group and has a bound styrene content of 35% by mass as well as a vinyl bond content of 78% in the butadiene part. In addition, it has a number average molecular weight of 4400, a weight average molecular weight of 5300 and a molecular weight distribution of 1.20.

Production Example 5

Synthesis of SB Copolymer E

To a sufficiently dehydrated and purified cyclohexane solvent are added 1 mol of 1,3-(diisopropenyl)benzene, then 2 mol of triethylamine and 2 mol of sec-butyllithium sequentially, followed by stirring at 50° C. for two hours to prepare a dilithium-based polymerization initiator.

To a 7-liter polymerization reactor after argon substitution are added 1.90 kg of dehydrated and purified cyclohexane, 1.90 kg of a solution of 22.9% by mass of 1,3-butadiene monomer in hexane, 0.900 kg of a solution of 20.0% by mass of styrene monomer in cyclohexane and 130.4 ml of a solution of 1.6 mol/liter of 2,2-bis(tetrahydrofuryl)propane in hexane, and then 108.0 ml of 0.5 mol/liter of the above-described dilithium-based polymerization initiator to initiate polymerization.

After polymerization in the polymerization reactor at a raised temperature of 50° C. for 1.5 hours, 108.0 ml of a solution of 1 mol/liter of ethylene oxide in cyclohexane is added to the mixture, which in turn is further stirred for two hours and then added with 50 ml of isopropyl alcohol. Subsequently, the solution of the polymer in hexane is precipitated in isopropyl alcohol and dried sufficiently to thereby obtain liquid rubber which has a hydroxyl group at each end and is liquid at 25° C.

The light-curable liquid rubber thus obtained is a styrene-butadiene copolymer (SB copolymer E) which is terminated at each end with a hydroxyl group and has a bound styrene content of 29% by mass as well as a vinyl bond content of 65% in the butadiene part. In addition, it has a number average molecular weight of 12,500, a weight average molecular weight of 16,000 and a molecular weight distribution of 1.26.

Production Example 6

Synthesis of SB Copolymer F

To a sufficiently dehydrated and purified cyclohexane solvent are added 1 mol of 1,3-(diisopropenyl)benzene, then 2 mol of triethylamine and 2 mol of sec-butyllithium sequentially, followed by stirring at 50° C. for two hours to prepare a dilithium-based polymerization initiator.

To a 7-liter polymerization reactor after argon substitution are added 2.20 kg of dehydrated and purified cyclohexane, 1.85 kg of a solution of 22.9% by mass of 1,3-butadiene monomer in hexane, 1.15 kg of a solution of 20.0% by mass of styrene monomer in cyclohexane and 130.4 ml of a solution of 1.6 mol/liter of 2,2-bis(tetrahydrofuryl)propane in hexane, and then 70 ml of 0.5 mol/liter of the above-described dilithium-based polymerization initiator to initiate polymerization.

After polymerization in the polymerization reactor at a raised temperature of 50° C. for 1.5 hours, 70 ml of a solution of 1 mol/liter of ethylene oxide in cyclohexane is added to the mixture, which in turn is further stirred for two hours and then added with 50 ml of isopropyl alcohol. Subsequently, the solution of the polymer in hexane is precipitated in isopropyl alcohol and dried sufficiently to thereby obtain liquid rubber which has a hydroxyl group at each end and is liquid at 25° C.

The light-curable liquid rubber thus obtained is a styrene-butadiene copolymer (SB copolymer F) which is terminated at each end with a hydroxyl group and has a bound styrene content of 35% by mass as well as a vinyl bond content of 60% in the butadiene part. In addition, it has a number average molecular weight of 17,200, a weight average molecular weight of 21,500 and a molecular weight distribution of 1.25.

<Preparation and Evaluation of Rubber Composition>

The styrene-butadiene copolymers synthesized as described above or commercially available diene-based polymers are used to prepare rubber compositions with combinations of components as shown in Tables 1-5. Evaluations are made to determine the curability and compatibility of the rubber compositions using the method as described below.

<<Light Curability Evaluation>>

One part by mass of IRGACURE 184D (1-hydroxycyclohexyl phenyl ketone, manufactured by Ciba Specialty Chemicals Inc.) is combined with 100 parts by mass of liquid rubber, which is then subjected to ultraviolet radiation at 7000 mJ/cm$^2$. Then, the curability of each composition is evaluated by hand at 23° C. The results are shown in Tables 1-5, where, compared with those in solution, "◦" (circle; good) represents compositions being completely cured to a solid, "Δ" (triangle; fair) indicates slightly cured, and "X" (cross; poor) indicates not cured at all.

<<Thermal Curability Evaluation>>

Five parts by mass of Trigonox 121 (t-amylperoxy-2-ethylhexanoate, manufactured by Kayaku Akzo Co.) is combined with 100 parts by mass of liquid rubber, which is then cured at 150° C. for ten minutes. Under this condition, the curability of each composition is evaluated by hand. The results are shown in Tables 1-5, where, compared with those in solution, "◦" (circle; good) represents compositions being completely cured to a solid, "Δ" (triangle; fair) indicates slightly cured, and "X" (cross; poor) indicates not cured at all.

<<Compatibility Evaluation>>

Following the combination of components, the obtained compositions are applied to transparent glass substrates and evaluated visually. The evaluation criteria are listed below and the results are shown in Tables 1-5.

○: clear
○Δ: slightly cloudy
Δ: cloudy
ΔX: slightly phase-separated
X: completely phase-separated or undissolved

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
|---|---|---|---|---|---|---|---|---|---|---|---|---|
| liquid rubber | Ricon 100[*1] | 100 | | | | | | | | | | |
| | Ricon 181[*2] | | 100 | | | | | | | | | |
| | SB copolymer A[*3] | | | 100 | 100 | | | | | | | |
| | SB copolymer B[*4] | | | | | 100 | 100 | 100 | 100 | | | |
| | SB copolymer C[*5] | | | | | | | | | 100 | 100 | 100 |
| | SB copolymer D[*6] | | | | | | | | | | | |
| | SB copolymer E[*7] | | | | | | | | | | | |
| | SB copolymer F[*8] | | | | | | | | | | | |
| polyol | TMMP[*19] | | | | 30 | | 30 | | | | 30 | |
| | TEMPIC[*20] | | | | | | | | 20 | | | |
| | PEMP[*21] | 10 | 10 | 30 | | | | | | 30 | 30 | |
| | DPMP[*22] | | | | | | | | | | | |
| | PE1[*23] | | | | | 20 | | | | | | |
| | EGMP-4[*24] | | | | | | | | | | | |
| | Compatibility Evaluation | ○ | ○ | ○ | ○ | ○Δ | ○ | ○ | ○ | ○ | ○ | ○ |
| | Light Curability | ○ | ○ | ○ | ○ | ○ | ○ | ○ | ○ | ○ | ○ | X |
| | Thermal Curability | ○ | ○ | ○ | ○ | ○ | ○ | ○ | ○ | ○ | ○ | X |

TABLE 2

| | | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|---|
| liquid rubber | Ricon 100[*1] | | | | | | | | | | |
| | Ricon 181[*2] | | | | | | | | | | |
| | SB copolymer A[*3] | | | | | | | | | | |
| | SB copolymer B[*4] | | | | | | | | | | |
| | SB copolymer C[*5] | 100 | 100 | 100 | 100 | | | | | | |
| | SB copolymer D[*6] | | | | | 100 | 100 | | | | |
| | SB copolymer E[*7] | | | | | | | 100 | 100 | | |
| | SB copolymer F[*8] | | | | | | | | | 100 | 100 |
| polyol | TMMP[*19] | | | | | | 20 | | 20 | | 20 |
| | TEMPIC[*20] | 20 | | | | | | | | | |
| | PEMP[*21] | | | | | 20 | | 20 | | 30 | |
| | DPMP[*22] | | 20 | | 10 | | | | | | |
| | PE1[*23] | | | | | | | | | | |
| | EGMP-4[*24] | | | 10 | | | | | | | |
| | Compatibility Evaluation | ○ | ○ | ○Δ | ○ | ○ | ○ | ○ | ○ | ○ | ○ |
| | Light Curability | ○ | ○ | ○ | ○ | ○ | ○ | ○ | ○ | ○ | ○ |
| | Thermal Curability | ○ | ○ | ○ | ○ | ○ | ○ | ○ | ○ | ○ | ○ |

TABLE 3

| | | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|
| liquid rubber | Ricon 100[*1] | 100 | | | | | | | | | | |
| | Poly ip[*9] | | 100 | 100 | 100 | 100 | 100 | | | | | |
| | Poly bd R-15HT[*10] | | | | | | | 100 | 100 | 100 | 100 | 100 |
| | LIR-30[*11] | | | | | | | | | | | |
| | LIR-50[*12] | | | | | | | | | | | |
| | LIR-300[*13] | | | | | | | | | | | |
| | LIR-403[*14] | | | | | | | | | | | |
| | Ricon 142[*15] | | | | | | | | | | | |
| | Ricon 150[*16] | | | | | | | | | | | |
| | Ricon 134[*17] | | | | | | | | | | | |
| | Ricon 154[*18] | | | | | | | | | | | |

TABLE 3-continued

|  |  | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|
| polyol | TMMP*19 |  |  | 10 |  |  |  |  |  | 10 |  |  |
|  | TEMPIC*20 |  |  |  | 10 |  |  |  |  |  | 10 |  |
|  | PEMP*21 |  | 10 |  |  |  |  |  | 10 |  |  |  |
|  | DPMP*22 |  |  |  |  | 10 |  |  |  |  |  | 10 |
|  | PE1*23 |  |  |  |  |  |  |  |  |  |  |  |
|  | EGMP-4*24 |  |  |  |  |  | 10 |  |  |  |  | 10 |
|  | 2,4,6-trimercaptotriazine*25 | 10 |  |  |  |  |  |  |  |  |  |  |
| Compatibility Evaluation |  | X | X | Δ | Δ | Δ | Δ | ΔX | X | X | X | X |
| Light Curability |  | X | Δ | X | X | X | X | X | Δ | X | X | X |
| Thermal Curability |  | X | X | Δ | X | Δ | X | Δ | Δ | Δ | Δ | X |

TABLE 4

|  |  | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 | Comp. Ex. 23 |
|---|---|---|---|---|---|---|---|---|---|---|---|---|
| liquid rubber | Poly ip*9 |  |  |  |  |  |  |  |  |  |  |  |
|  | Poly bd R-15HT*10 |  |  |  |  |  |  |  |  |  |  |  |
|  | LIR-30*11 | 100 | 100 |  |  |  |  |  |  |  |  |  |
|  | LIR-50*12 |  |  | 100 | 100 | 100 | 100 | 100 |  |  |  |  |
|  | LIR-300*13 |  |  |  |  |  |  |  | 100 | 100 |  |  |
|  | LIR-403*14 |  |  |  |  |  |  |  |  |  | 100 | 100 |
|  | Ricon 142*15 |  |  |  |  |  |  |  |  |  |  |  |
|  | Ricon 150*16 |  |  |  |  |  |  |  |  |  |  |  |
|  | Ricon 134*17 |  |  |  |  |  |  |  |  |  |  |  |
|  | Ricon 154*18 |  |  |  |  |  |  |  |  |  |  |  |
| polyol | TMMP*19 |  | 10 |  | 10 |  |  |  |  | 10 |  | 10 |
|  | TEMPIC*20 |  |  |  |  | 10 |  |  |  |  |  |  |
|  | PEMP*21 | 10 |  | 10 |  |  |  |  | 10 |  | 10 |  |
|  | DPMP*22 |  |  |  |  |  | 10 |  |  |  |  |  |
|  | PE1*23 |  |  |  |  |  |  |  |  |  |  |  |
|  | EGMP-4*24 |  |  |  |  |  |  | 10 |  |  |  |  |
| Compatibility Evaluation |  | Δ | Δ | Δ | Δ | X | ΔX | X | Δ | ΔX | Δ | Δ |
| Light Curability |  | X | X | X | X | Δ | Δ | X | Δ | Δ | Δ | X |
| Thermal Curability |  | X | X | X | X | Δ | Δ | X | Δ | Δ | Δ | X |

TABLE 5

|  |  | Comp. Ex. 24 | Comp. Ex. 25 | Comp. Ex. 26 | Comp. Ex. 27 | Comp. Ex. 28 | Comp. Ex. 29 | Comp. Ex. 30 | Comp. Ex. 31 | Comp. Ex. 32 | Comp. Ex. 33 | Comp. Ex. 34 | Comp. Ex. 35 |
|---|---|---|---|---|---|---|---|---|---|---|---|---|---|
| liquid rubber | Poly ip*9 |  |  |  |  |  |  |  |  |  |  |  |  |
|  | Poly bd R-15HT*10 |  |  |  |  |  |  |  |  |  |  |  |  |
|  | LIR-30*11 |  |  |  |  |  |  |  |  |  |  |  |  |
|  | LIR-50*12 |  |  |  |  |  |  |  |  |  |  |  |  |
|  | LIR-300*13 |  |  |  |  |  |  |  |  |  |  |  |  |
|  | LIR-403*14 |  |  |  |  |  |  |  |  |  |  |  |  |
|  | Ricon 142*15 | 100 | 100 | 100 | 100 | 100 |  |  |  |  |  |  |  |
|  | Ricon 150*16 |  |  |  |  |  | 100 |  |  |  |  |  |  |
|  | Ricon 134*17 |  |  |  |  |  |  | 100 |  |  |  |  |  |
|  | Ricon 154*18 |  |  |  |  |  |  |  | 100 | 100 | 100 | 100 | 100 |
| polyol | TMMP*19 |  |  | 10 |  |  |  |  |  | 10 |  |  |  |
|  | TEMPIC*20 |  |  |  | 10 |  |  |  |  |  | 10 |  |  |
|  | PEMP*21 |  | 10 |  |  |  | 10 | 10 | 10 |  |  |  |  |

TABLE 5-continued

| | Comp. Ex. 24 | Comp. Ex. 25 | Comp. Ex. 26 | Comp. Ex. 27 | Comp. Ex. 28 | Comp. Ex. 29 | Comp. Ex. 30 | Comp. Ex. 31 | Comp. Ex. 32 | Comp. Ex. 33 | Comp. Ex. 34 | Comp. Ex. 35 |
|---|---|---|---|---|---|---|---|---|---|---|---|---|
| DPMP*[22] | | | | 10 | | | | | | | | |
| PE1*[23] | | | | | | | | | | | 10 | |
| EGMP-4*[24] | | | | | 10 | | | | | | | 10 |
| Compatibility Evaluation | X | X | X | X | X | Δ | Δ | Δ | Δ | Δ | Δ | Δ |
| Light Curability | Δ | Δ | X | X | Δ | X | Δ | X | Δ | X | X | Δ |
| Thermal Curability | Δ | Δ | Δ | Δ | Δ | Δ | Δ | Δ | Δ | Δ | Δ | Δ |

*[1]Ricon 100, manufactured by Sartomer Company, Inc., number average molecular weight = 4200, bound styrene content = 25% by mass, vinyl bond content in butadiene part = 60%, terminal functional group: none, liquid at 25° C.
*[2]Ricon 181, manufactured by Sartomer Company, Inc., number average molecular weight = 3200, bound styrene content = 25% by mass, vinyl bond content in butadiene part = 30%, terminal functional group: none, liquid at 25° C.
*[3]SB copolymer A, synthesized by the above-described method, number average molecular weight = 5200, bound styrene content = 35% by mass, vinyl bond content in butadiene part = 65%, terminal functional group: OH, liquid at 25° C.
*[4]SB copolymer B, synthesized by the above-described method, number average molecular weight = 4000, bound styrene content = 55% by mass, vinyl bond content in butadiene part = 65%, terminal functional group: OH, liquid at 25° C.
*[5]SB copolymer C, synthesized by the above-described method, number average molecular weight = 4900, bound styrene content = 23% by mass, vinyl bond content in butadiene part = 65%, terminal functional group: OH, liquid at 25° C.
*[6]SB copolymer D, number average molecular weight = 4400, bound styrene content = 35% by mass, vinyl bond content in butadiene part = 78%, terminal functional group: OH, liquid at 25° C.
*[7]SB copolymer E, number average molecular weight = 12500, bound styrene content = 29% by mass, vinyl bond content in butadiene part = 65%, terminal functional group: OH, liquid at 25° C.
*[8]SB copolymer F, number average molecular weight = 17200, bound styrene content = 35% by mass, vinyl bond content in butadiene part = 60%, terminal functional group: OH, liquid at 25° C.
*[9]Poly ip (isoprene rubber, homopolymer), manufactured by Idemitsu Kosan Co., Ltd., number average molecular weight = 2500, terminal functional group: OH, polyisoprene liquid at 25° C.
*[10]Poly bd R-15HT (butadiene rubber, 1,4-polybutadiene structure), manufactured by Idemitsu Kosan Co., Ltd., number average molecular weight = 1200, terminal functional group: OH
*[11]LIR-30 (isoprene rubber, homopolymer), manufactured by KURARAY CO., LTD., number average molecular weight = 28000, terminal functional group: none
*[12]LIR-50 (isoprene rubber, homopolymer), manufactured by KURARAY CO., LTD., number average molecular weight = 54000, terminal functional group: none
*[13]LIR-300 (butadiene rubber, 1,4-polybutadiene structure), manufactured by KURARAY CO., LTD., number average molecular weight = 44000, terminal functional group: none
*[14]LIR-403 (isoprene rubber, functional group-containing homopolymer), manufactured by KURARAY CO., LTD., number average molecular weight = 34000, terminal functional group: maleic anhydride
*[15]Ricon 142 (butadiene rubber, 1,4-polybutadiene structure), manufactured by Sartomer Company, Inc., number average molecular weight = 3900, bound styrene content = 0% by mass, vinyl bond content in butadiene part = 55%, terminal functional group: none, polybutadiene liquid at 25° C.
*[16]Ricon 150 (butadiene rubber, 1,4-polybutadiene structure), manufactured by Sartomer Company, Inc., number average molecular weight = 3900, vinyl bond content in butadiene part = 70%, terminal functional group: none
*[17]Ricon 134 (butadiene rubber, 1,4-polybutadiene structure), manufactured by Sartomer Company, Inc., number average molecular weight = 8000, vinyl bond content in butadiene part = 28%, terminal functional group: none
*[18]Ricon 154 (butadiene rubber, 1,3-butadiene homopolymer), manufactured by Sartomer Company, Inc., number average molecular weight = 5200, terminal functional group: none
*[19]TMMP, trimethylol propane tris(3-mercaptopropionate)
*[20]TEMPIC, tris[(3-mercaptopropionyloxy)-ethyl]isocyanurate
*[21]PEMP, pentaerythritol tetrakis(3-mercaptopropionate),
*[22]DPMP, dipentaerythritol hexakis(3-mercaptopropionate),
*[23]PE1, pentaerythritol tetrakis(3-mercaptobutylate),
*[24]EGMP-4, tetraethylene glycol bis(3-mercaptopropionate),
*[25]Zisnet F, manufactured by SANKYO KASEI Co., Ltd.

It can be seen from the results shown in Tables 1-5 that Examples 1-20, which contain both (A) a styrene-butadiene copolymer which is liquid at 25° C. and (B) a polythiol derived from mercaptocarboxylic acid, offer good compatibility as compared with Comparative Example 1, which contains only (A) a styrene-butadiene copolymer, Comparative Example 2, which uses polythiol not derived from a mercaptocarboxylic acid, and Comparative Examples 3-35, each of which uses a liquid rubber other than a styrene-butadiene copolymer. It will also be appreciated that Examples 1-20 have beneficial effects on both light curability and thermal curability.

The invention claimed is:

1. A thiol-containing liquid rubber composition comprising:
   (A) a styrene-butadiene copolymer which is liquid at 25° C.; and
   (B) a polythiol derived from mercaptocarboxylic acid,
   wherein the styrene-butadiene copolymer (A) is a random copolymer and has a number average molecular weight (Mn) of 3200 to 17200, and
   wherein the rubber composition is thermally curable.

2. The thiol-containing liquid rubber composition according to claim 1, wherein the styrene-butadiene copolymer (A) has a bound styrene content of 20 to 90% by mass.

3. The thiol-containing liquid rubber composition according to claim 1, wherein the polythiol (B) is at least one selected from the group consisting of tetraethylene glycol bis(3-mercaptopropionate), trimethylol propane tris(3-mercaptopropionate), tris[(3-mercaptopropionyloxy)-ethyl]isocyanurate, pentaerythritol tetrakis(3-mercaptopropionate), dipentaerythritol hexakis(3-mercaptopropionate), 1,4-bis(3-mercaptobutyryloxy)butane, pentaerythritol tetrakis(3-mercaptobutylate) and 1,3,5-tris(3-mercaptobutyloxyethyl)-1,3,5-triazine-2,4,6(1H,3H,5H)-trione.

4. The thiol-containing liquid rubber composition according to claim 1, wherein the polythiol (B) is contained in an amount of 40 parts by mass or less per 100 parts by mass of the styrene-butadiene copolymer (A).

5. The thiol-containing liquid rubber composition according to claim 1, wherein the styrene-butadiene copolymer (A) has a number average molecular weight (Mn) of 4000-17200.

* * * * *